United States Patent
Ali et al.

(10) Patent No.: US 8,664,973 B2
(45) Date of Patent: Mar. 4, 2014

(54) COMMON MODE TERMINATION WITH C-MULTIPLIER CIRCUIT

(75) Inventors: Tamer Ali, Irvine, CA (US); Ali Nazemi, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/567,682

(22) Filed: Aug. 6, 2012

(65) Prior Publication Data

US 2014/0035696 A1 Feb. 6, 2014

(51) Int. Cl.
*H03K 17/16* (2006.01)
*H03K 19/003* (2006.01)
*H03L 5/00* (2006.01)

(52) U.S. Cl.
USPC .............................................. 326/30; 327/333

(58) Field of Classification Search
USPC .............................................. 326/30; 327/333
See application file for complete search history.

(56) References Cited

U.S. PATENT DOCUMENTS

| | | | | |
|---|---|---|---|---|
| 5,955,911 A | * | 9/1999 | Drost et al. | 327/404 |
| 6,448,813 B2 | * | 9/2002 | Garlepp et al. | 326/83 |
| 6,590,413 B1 | * | 7/2003 | Yang | 326/30 |
| 6,700,823 B1 | * | 3/2004 | Rahman et al. | 365/189.05 |
| 6,864,704 B1 | * | 3/2005 | Wong et al. | 326/26 |
| 7,245,144 B1 | * | 7/2007 | Wong et al. | 326/26 |
| 7,417,462 B1 | * | 8/2008 | Wong et al. | 326/82 |
| 7,450,048 B2 | * | 11/2008 | Lin | 341/155 |
| 7,675,326 B1 | * | 3/2010 | Luo et al. | 326/86 |
| 2006/0176074 A1 | * | 8/2006 | Van Epps et al. | 326/30 |

* cited by examiner

*Primary Examiner* — Shawki Ismail
*Assistant Examiner* — Dylan White
(74) *Attorney, Agent, or Firm* — Sterne, Kessler, Goldstein & Fox P.L.L.C.

(57) ABSTRACT

Embodiments of the present disclosure provide input termination circuits that overcome the deficiencies of conventional designs. Specifically, embodiments eliminate large-on chip bypass capacitors that are commonly used for common mode termination, and instead use an active capacitor-multiplier (C-multiplier) circuit at the common mode node. The C-multiplier circuit mimics a large capacitor at high frequency. By eliminating large on-chip bypass capacitors, the IC design (e.g., receiver) is reduced in size, without affecting common mode return loss performance. Embodiments may be used with any applications that require input termination, and particularly with differential applications that require common mode termination.

20 Claims, 4 Drawing Sheets

COMMON MODE TERMINATION WITH C-MULTIPLIER CIRCUIT

FIELD OF THE INVENTION

The present disclosure relates generally to electric termination.

BACKGROUND

Background Art

A termination circuit serves to prevent or reduce the reflection of a signal transmitted from a first circuit to a second circuit over a transmission line. Specifically, the termination circuit ensures that the output impedance of the first circuit is matched to the combined input impedance of the termination circuit and the second circuit. This type of impedance matching ensures maximum or near maximum power transfer from the first circuit to the second circuit. In other matching types, the termination circuit may be used to ensure maximum voltage or current transfer from the first circuit to the second circuit.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
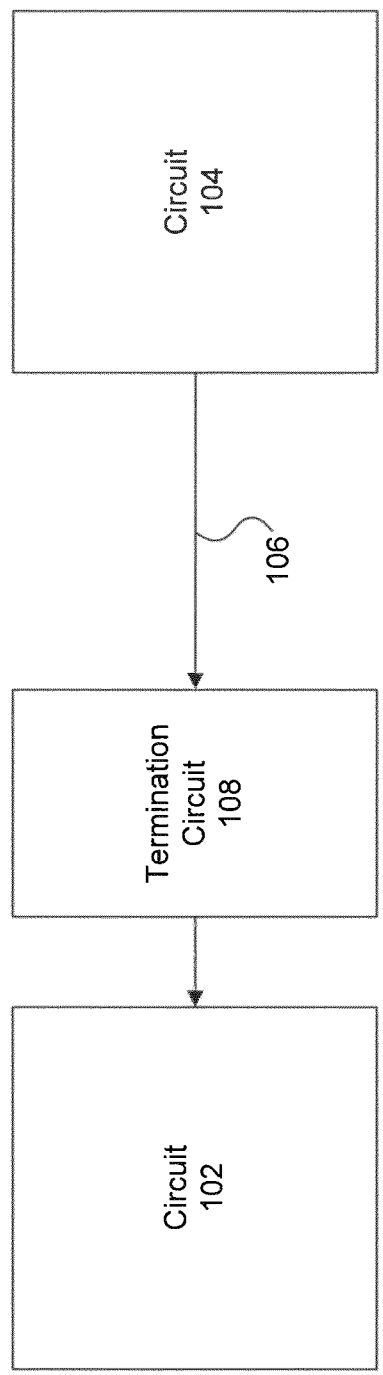
FIG. 1 is an example that illustrates electric termination.

FIG. 1 is an example 100 that illustrates electric termination. Example 100 includes a first circuit 102, a second circuit 104, a transmission line 106, and a termination circuit 108. First circuit 102 and second circuit 104 may be located, for example, on the same integrated circuit (IC), on different ICs located on the same printed circuit board (PCB), or on different PCBs within the same device. As would be understood by a person of skill in the art based on the teachings herein, example 100 is provided for the purpose of illustration only and is not limiting of embodiments of the present disclosure.

As shown in FIG. 1, first circuit 102 and second circuit 104 are coupled via transmission line 106. Termination circuit 108 is coupled to transmission line 106 and to first circuit 102. Termination circuit 108 may be, for example, coupled in parallel with first circuit 102. In an embodiment, termination circuit 108 is integrated on the same IC as first circuit 102.

In example 100, first circuit 102 is configured to receive a signal from second circuit 104. For example, first circuit 102 may be a radio frequency (RF) receiver and second circuit 104 may be a wireless antenna, configured to wirelessly receive a RF signal and to forward the received RF signal to the RF receiver over transmission line 106. In another example, first circuit 102 may be a serializer-deserializer (SERDES) module and second circuit 104 may be an optical transceiver, configured to produce an electrical signal from an optical signal received over a fiber optic cable and to forward the electrical signal to the SERDES module over transmission line 106.

In an embodiment, termination circuit 108 serves to prevent or reduce the reflection of the signal transmitted from second circuit 104 to first circuit 102 over transmission line 106. Specifically, termination circuit 108 ensures that the output impedance of second circuit 104 is matched to the combined input impedance of termination circuit 108 and first circuit 102. This type of impedance matching ensures maximum or near maximum power transfer from second circuit 104 to first circuit 102. In other embodiments, termination circuit 108 may be used to ensure maximum voltage or current transfer from second circuit 104 to first circuit 102, and may thus ensure a different type of matching.

As would be understood by a person of skill in the art based on the teachings herein, termination circuit 108 may implement various termination schemes depending on the specific application of example 100. The specific application of example 100 also governs whether termination circuit 108 implements a single-ended or a differential termination configuration.

In certain differential applications, termination circuit 108 may also be used to provide common mode termination. For example, differential receiver applications typically specify a minimum common mode return loss ($10 \log_{10} P_i/P_r$, where $P_i$ is the incident power and $P_r$ is the reflected power) that must be met by the receiver. Commonly, common mode return, loss compliance is ensured by the use of a termination circuit, such as termination circuit 108. Specifically, in such applications, the signal transmitted from second circuit 104 to first circuit 102 is a differential signal having a common mode signal, and termination circuit 108 is used to terminate the common mode signal such that it does not reflect back over transmission line 106 beyond the allowed common mode return loss.

Figure 2:
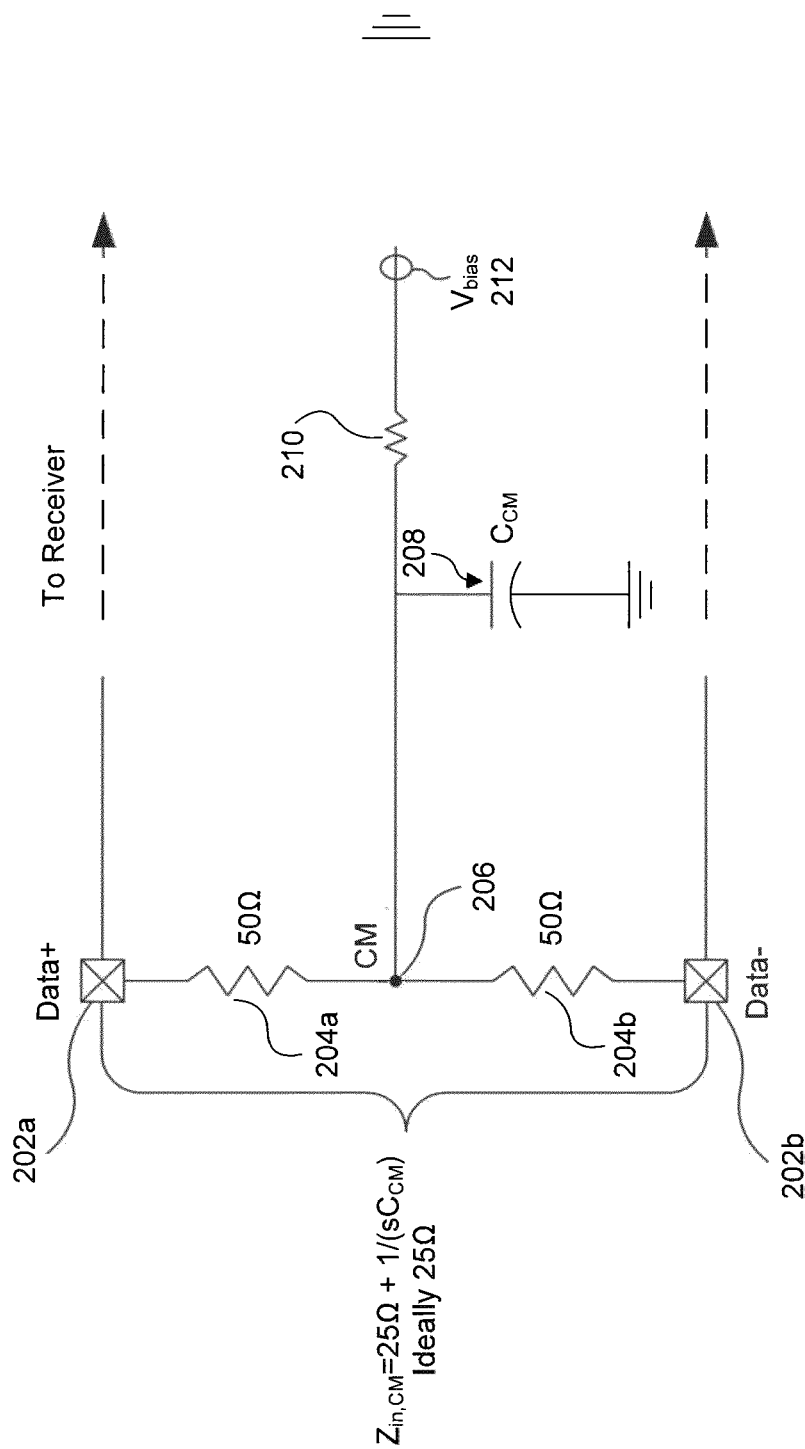
FIG. 2 illustrates a conventional input termination circuit.

FIG. 2 illustrates a conventional input termination circuit 200. As shown in FIG. 2, input termination circuit 200 includes first and second input terminals 202a and 202b, first and second resistors 204a and 204b, a bypass capacitor 208, and a bias resistor 210.

First and second input terminals 202a and 202b are configured to receive a differential pair of input signals from a source circuit (e.g., antenna, optical transceiver, etc.) over respective transmission lines (not shown in FIG. 2), and to couple to a differential input of a receiver (not shown in FIG. 2), for example.

To ensure differential matching between the source circuit and the receiver, termination circuit 200 implements a differential configuration as shown in FIG. 2. Specifically, first resistor 204a is coupled between first input terminal 202a and a common mode node 206, and second resistor 204b is coupled between second input terminal 202b and common mode node 206. First and second resistors 204a and 204h are each matched to the characteristic impedance of the respective transmission lines. Typically, the respective transmission lines have equal characteristic impedances (e.g., 50 Ohms), and therefore first and second resistors 204a and 204b are also matched to each other.

For common mode termination/matching, common mode node 206 is biased to a pre-determined voltage by applying a bias voltage 212 to bias resistor 210 coupled to common mode node 206. This, however, causes the common mode input impedance of input termination circuit 200 to deviate from an ideal common mode input impedance value (e.g., 25 Ohms). In particular, the common mode input impedance of input termination circuit 200 is determined by shunting together input terminals 202a and 202b and measuring the input impedance of input termination circuit 200. In this configuration, the impedance of bias resistor 210 adds in series with the combined parallel impedance of resistors 204a and 204b.

To reduce the impact of bias resistor 210 on the common mode input impedance of input termination circuit 200, bypass capacitor 208 is selected to have a relatively large capacitance (e.g., 80-100 pF in optical/SERDES applications) and is coupled to common mode node 206 as shown in FIG. 2. The common mode input impedance of input termination circuit 200 can thus be approximated as $Z_{in,CM}$=25 $\Omega$+1/(s$C_{CM}$), where $C_{CM}$ is the capacitance of bypass capacitor 208. This allows input termination circuit 200 to approach the ideal common mode input impedance value of 25 Ohms and to meet the minimum common mode return loss (e.g., 6 dB).

The solution provided by input termination circuit 200 is problematic, however, from a circuit design point of view. On one hand, although desired for various reasons, the integration of capacitor 208 on the same IC as the receiver is made difficult by size of bypass capacitor 208, which would increase significantly the size of the receiver IC. On the other hand, implementing input termination circuit 200 or capacitor 208 outside of the receiver IC comes with the cost of processing an extra component during fabrication/testing and the cost of implementing an extra pin on the IC to interface with the extra component.

Embodiments of the present disclosure, as further described below, provide input termination circuits that overcome the deficiencies of conventional designs. Specifically, embodiments eliminate large-on chip bypass capacitors that are commonly used for common mode termination, and instead use an active capacitor-multiplier (C-multiplier) circuit at the common mode node. The C-multiplier circuit mimics a large capacitor at high frequency. By eliminating large on-chip bypass capacitors, the IC design (e.g., receiver) is reduced in size, without affecting common mode return loss performance. Further, embodiments exhibit low leakage, which reduces the effect of the input termination circuit on the common mode of the driving circuitry (e.g., antenna). Embodiments may be used with any application that requires input termination, and particularly with differential applications that require common mode termination. For example, embodiments may be used for input termination circuit 108 in example 100 described above in FIG. 1.

Figure 3:
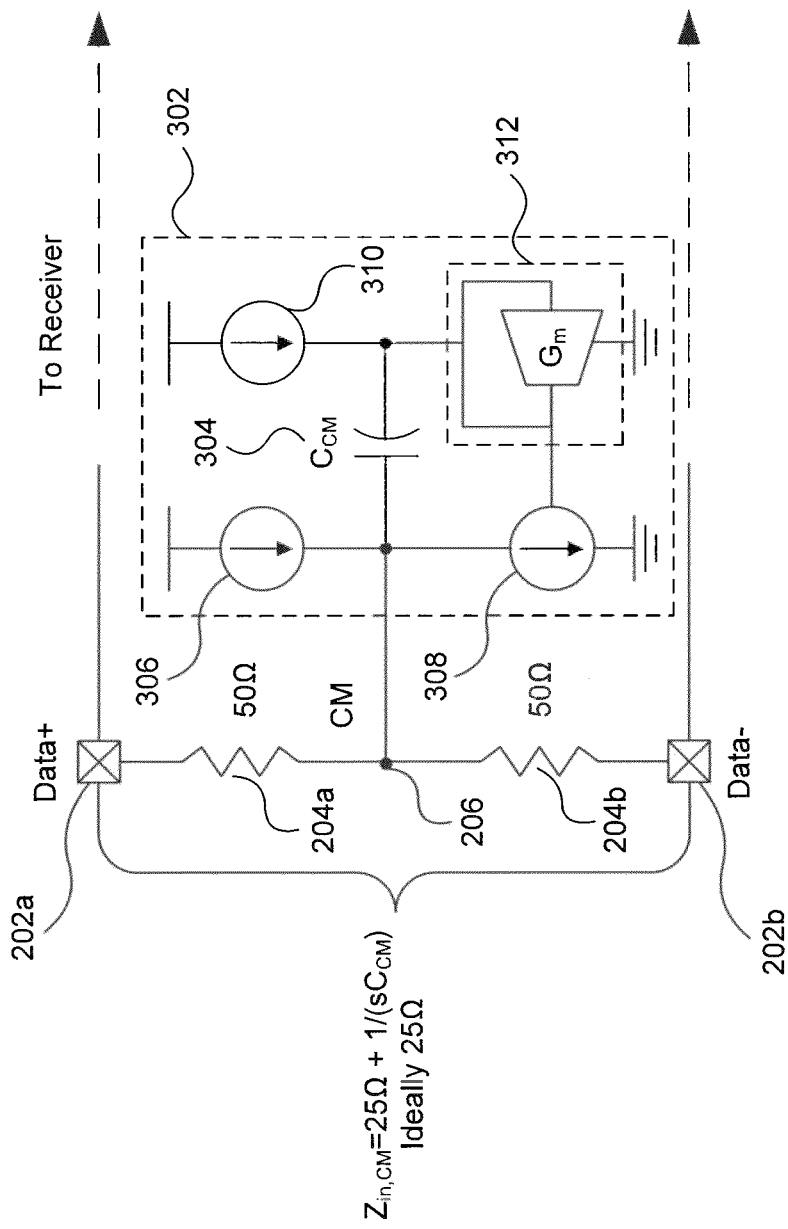
FIG. 3 illustrates an example input termination circuit according to an embodiment of the present disclosure.

FIG. 3 illustrates an example input termination circuit 300 according to an embodiment of the present disclosure. Example circuit 300 is provided for the purpose of illustration only and is not limiting of embodiments of the present disclosure. As shown in FIG. 3, example input termination circuit 300 includes first and second input terminals 202a and 202b, first and second resistors 204a and 204b, and a C-multiplier circuit 302.

As in input termination circuit 200 described above, first and second input terminals 202a and 202b are configured to receive a differential pair of input signals from a source circuit (e.g., antenna, optical transceiver, etc.) over respective transmission lines (not shown in FIG. 3), and to couple to a differential input of a receiver (not shown in FIG. 3), for example. To ensure differential matching between the source circuit and the receiver, a differential configuration is used, whereby first resistor 204a is coupled between first input terminal 202a and common mode node 206, and second resistor 204b is coupled between second input terminal 202b and common mode node 206. First and second resistors 204a and 204b are each matched to the characteristic impedance of the respective transmission lines. Typically, the respective transmission lines have equal characteristic impedances (e.g., 50 Ohms), and therefore first and second resistors 204a and 204b are also matched to each other.

C-multiplier circuit 302 is coupled to common mode node 206. In an embodiment, C-multiplier circuit 302 is configured to mimic bypass capacitor 208 described above in FIG. 2. Specifically, C-multiplier circuit 302 is configured to set to zero or near zero an alternating current (AC) voltage at common mode node 206.

In an embodiment, as shown in FIG. 3, C-multiplier circuit includes a capacitor 304, current sources 306, 308, and 310, and a transconductance stage 312. Capacitor 304 has a first end coupled to common mode node 206 and a second end coupled to transconductance stage 312. Transconductance stage 312 is coupled between the second end of capacitor 304 and a ground terminal. Current source 306 is coupled between a supply voltage terminal and the first end of capacitor 304, and current source 310 is coupled between the supply voltage terminal and the second end of capacitor 304. Current source 308 is coupled between common mode node 206 and the ground terminal.

In an embodiment, current source 308 and transconductance stage 312 are implemented using N-type transistors (e.g., NMOS) and current sources 306 and 310 are implemented using P-type transistors (e.g., PMOS). As such, all AC current that flows from common mode node 206 to C-multiplier circuit 302 is sunk by current source 308 and transconductance stage 312. More specifically, the AC current that flows through capacitor 304 (from the first end TO the second end) flows in its entirety through transconductance stage 312 to the ground terminal. Zero or near zero current flows through current sources 306 and 310.

In an embodiment, transconductance stage 312 and current source 308 form a current mirror, such that current source 308 sinks a current that is an integer multiple (M:1) or nearly an integer multiple of the current that flows through transconductance stage 312 (or the current that flows through capacitor 304). Accordingly, C-multiplier circuit 302 sinks an effective current that is equivalent to (1+M) times the current that flows through capacitor 304. In other words, C-multiplier circuit 302 is equivalent to a capacitor that has (M+1) times the capacitance of capacitor 304, and that is capable of sinking a (M+1) times larger current.

For illustration purposes, if the integer M is equal to 100, then C-multiplier circuit 302 would mimic a capacitor that is 101 times larger than capacitor 304. Accordingly, C-multiplier circuit 302 can be used to replace and mimic bypass capacitor 208 described above in FIG. 2, but with capacitor 304 being M times smaller than capacitor 208. The area requirement of C-multiplier circuit 302 is thus significantly lower than the area requirement of capacitor 208, which facilitates the integration of C-multiplier circuit 302 on the same IC as the receiver, for example.

Figure 4:
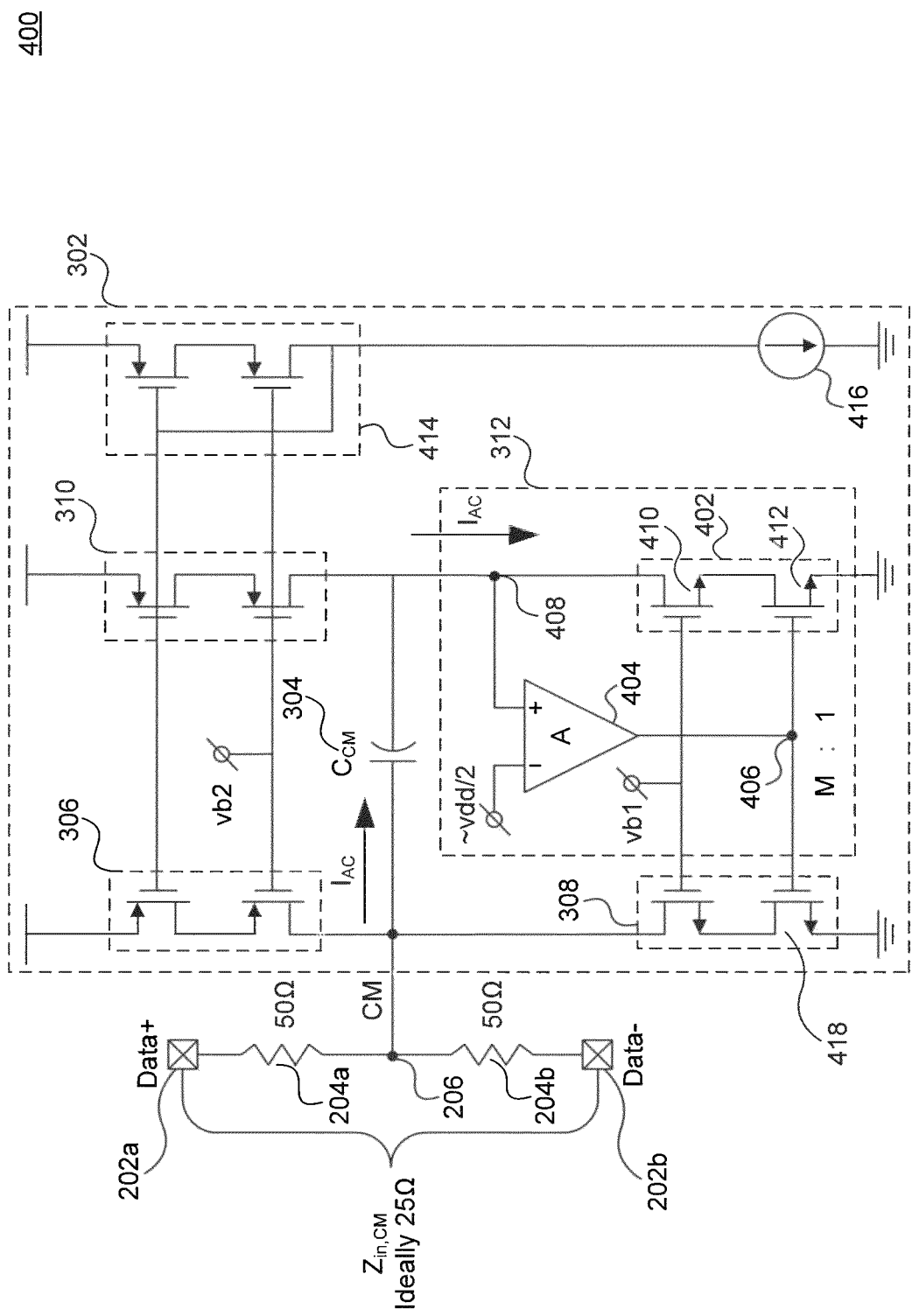
FIG. 4 illustrates an example input termination circuit according to an embodiment of the present disclosure.

FIG. 4 illustrates another example input termination circuit 400 according to an embodiment of the present disclosure. Example input termination circuit 400 is provided for the purpose of illustration only and is not limiting of embodiments of the present disclosure. Example circuit 400 may be an embodiment of termination circuit 108 described above in FIG. 1 or example input termination circuit 300 described above in FIG. 3.

Like example circuit 300, example input termination circuit 400 includes first and second input terminals 202a and 202b, first and second resistors 204a and 204b, and a C-multiplier circuit 302 coupled to common mode node 206. First and second input terminals 202a and 202b are configured to receive a differential pair of input signals from a source circuit (e.g., antenna, optical transceiver, etc.) over respective transmission lines (not shown in FIG. 4), and to couple to a differential input of a receiver (not shown in FIG. 4), for example.

To ensure differential matching between the source circuit and the receiver, a differential configuration is implemented, whereby first resistor 204a is coupled between first input terminal 202a and common mode node 206, and second resistor 204b is coupled between second input terminal 202b and common mode node 206. First and second resistors 204a and 204b are each matched to the characteristic impedance of the respective transmission lines. Typically, the respective transmission lines have equal characteristic impedances (e.g., 50 Ohms), and therefore first and second resistors 204a and 204b are also matched to each other.

C-multiplier circuit 302 includes capacitor 304, current sources 306, 308, and 310, and transconductance stage 312. In an embodiment, as shown in FIG. 4, C-multiplier circuit 302 further includes current sources 414 and 416. Current sources 306, 310, and 414 are each implemented as a PMOS cascode stage. Current source 308 is implemented as a NMOS cascode stage.

Transconductance stage 312 includes a NMOS cascode stage 402, comprising NMOS transistors 410 and 412, and an amplifier 404. Amplifier 404 has a non-inverting input node coupled to a drain terminal of NMOS transistor 410, an inverting input node coupled to a supply voltage (e.g., ~Vdd/2), and an output terminal coupled to a gate terminal of NMOS transistor 412.

In an embodiment, NMOS transistor 412 and amplifier 404 form a diode-connected transistor, which together with NMOS transistor 418 of current source 308 form a current mirror. The current mirror ratio M can be configured as described above in FIG. 3, in order to be able to reduce the capacitance of capacitor 304 as much as practically possible. Accordingly, the AC current that flows through current source 308 is M times the AC current that flows through NMOS cascode stage 402, which is equal to the AC current that flows through capacitor 304. Effectively, therefore, a current equivalent to (1+M) times the current that flows through capacitor 304 is sunk from common mode node 206. Thus, C-multiplier circuit 302 has the effect of multiplying capacitor 304 by (1+M), thereby mimicking a much larger capacitance.

In operation, the input impedance of C-multiplier circuit 302 is given by:

$$Z_{in} = \left(\frac{1}{(1+M)sC} + \frac{1}{g_m(1+M)A}\right) \| r_{ds,1} \| r_{ds,2}$$

where C is the capacitance of capacitor 304, M is the current mirror ratio, $g_m$ is the transconductance gain of NMOS cascode stage 402, A is the gain of amplifier 404, $r_{ds,1}$ is a combined drain-to-source resistance of NMOS cascode 308, and $r_{ds,2}$ is a combined drain-to-source resistance of PMOS cascode stages 306, 310, and 414.

Typically, the input impedance of C-multiplier circuit 302 is dominated by the term $$\left(\frac{1}{(1+M)sC} + \frac{1}{g_m(1+M)A}\right),$$

which includes an impedance contributed by transconductance stage 312. It is desired that this impedance be reduced in order for C-multiplier circuit 302 to mimic an ideal capacitor.

In an embodiment, the impedance of transconductance stage 312 is reduced by configuring amplifier 404 to have a large gain A, thus increasing the transconductance gain of transconductance stage 312. This also has the effect of improving the Q factor of capacitor 304 and the common mode return loss at low frequency, which is a stringent requirement for SERDES products, for example.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. An input termination circuit having first and second input terminals, comprising:
    a first resistive element having a first end coupled to the first input terminal and a second end coupled to a common mode node of the input termination circuit;
    a second resistive element having a first end coupled to the second input terminal and a second end coupled to the common mode node; and
    a capacitor-multiplier circuit, coupled to the common mode node, comprising:
        a capacitor having first end and a second end, the first end coupled to the common mode node; and
        a transconductance stage coupled between the second end of the capacitor and a ground terminal.

2. The input termination circuit of claim 1, wherein the capacitor-multiplier circuit is configured to set to zero or near zero an alternating current (AC) voltage at the common mode node.

3. The input termination circuit of claim 2, wherein the transconductance stage includes a diode-connected transistor.

4. The input termination circuit of claim 2, wherein the transconductance stage includes an NMOS transistor and an amplifier coupled between a drain terminal and a gate terminal of the NMOS transistor.

5. The input termination circuit of claim 4, wherein the amplifier is configured to reduce an input resistance of the input termination circuit.

6. The input termination circuit of claim 2, wherein the capacitor-multiplier circuit further comprises:
    a first current source coupled between the common mode node and the ground terminal.

7. The input termination circuit of claim 6, wherein the first current source comprises a NMOS cascode stage.

8. The input termination circuit of claim 6, wherein the transconductance stage and the first current source form a current mirror circuit.

9. The input termination circuit of claim 8, wherein the transconductance stage is configured to sink a first AC current, wherein the first AC current is equivalent to an AC current that flows through the capacitor.

10. The input termination circuit of claim 9, wherein the first current source is configured to sink a second AC current, wherein the second AC current is equivalent to an integer multiple of the first AC current.

11. The input termination circuit of claim 6, wherein the capacitor-multiplier circuit further comprises:
   a second current source coupled between a supply voltage terminal and the first end of the capacitor; and
   a third current source coupled between the supply voltage terminal and the second end of the capacitor.

12. The input termination circuit of claim 2, wherein the capacitor-multiplier circuit comprises:
   a PMOS stage coupled to the capacitor; and
   a NMOS stage coupled to the capacitor.

13. The input termination circuit of claim 12, wherein the PMOS stage is configured to sink zero or near zero AC current.

14. The input termination circuit of claim 12, wherein the NMOS stage is configured to sink a first AC current, wherein the first AC current is substantially equal to a multiple of an AC current that flows through the capacitor.

15. A device, comprising:
   a first circuit;
   a second circuit; and
   an input termination circuit, coupled between the first circuit and the second circuit, wherein the input termination circuit comprises:
      a first resistive element having a first end coupled to a first input terminal of the input termination circuit and a second end coupled to a common mode node of the input termination circuit;
      a second resistive element having a first end coupled to a second input terminal of the input termination circuit and a second end coupled to the common mode node; and
      a capacitor-multiplier circuit coupled to the common mode node, wherein the capacitor-multiplier circuit comprises:
         a capacitor having a first end and a second end, the first end coupled to the common mode node; and
         a transconductance stage coupled between the second end of the capacitor and a ground terminal.

16. The device of claim 15, wherein the capacitor-multiplier circuit is configured to set to zero or near zero an alternating current (AC) voltage at the common mode node of the input termination circuit.

17. The device of claim 15, wherein the first input terminal and the second input terminal of the input termination circuit are configured to receive a differential input signal from the first circuit.

18. The device of claim 17, wherein the input termination circuit is configured to terminate a common mode signal of the differential input signal.

19. The device of claim 17, wherein the input termination circuit is configured to provide differential impedance matching between the first circuit and the second circuit.

20. The device of claim 15, wherein the second circuit includes one of a wireless antenna and an optical transceiver, and wherein the first circuit includes one of a radio frequency (RF) receiver and serializer-deserializer (SERDES) module.

* * * * *

UNITED STATES PATENT AND TRADEMARK OFFICE
CERTIFICATE OF CORRECTION

| | |
|---|---|
| PATENT NO. | : 8,664,973 B2 |
| APPLICATION NO. | : 13/567682 |
| DATED | : March 4, 2014 |
| INVENTOR(S) | : Ali et al. |

Page 1 of 1

It is certified that error appears in the above-identified patent and that said Letters Patent is hereby corrected as shown below:

In the Claims

In column 6, line 44, claim 1, please insert --a-- in front of --first end--.

Signed and Sealed this
First Day of July, 2014

Michelle K. Lee
*Deputy Director of the United States Patent and Trademark Office*